2,771,738

MORPHOLINES AS HYPERGOLIC FUELS

Cleveland R. Scott and Arnold L. Ayers, Bartlesville, Okla., assignors to Phillips Petroleum Company, a corporation of Delaware No Drawing. Application October 1, 1951, Serial No. 249,217

9 Claims. (Cl. 60—35.4)

This invention relates to rocket propellants. In one of its more specific aspects this invention relates to hypergolic fuels and their application to the propulsion of rockets.

Our invention is concerned with new and novel rocket propellants and their utilization; a rocket or jet propulsion device, being defined herein as a rigid container for matter and energy so arranged that a portion of the matter can absorb energy in kinetic form and subsequently be ejected in a specified direction. The type of rocket to which our invention is applied is that type of jet propulsion device designated as a "pure" rocket, i. e., a thrust producer which does not make use of the surrounding atmosphere. A rocket of the type with which our invention is concerned is propelled by introduction of a propellant material into a combustion chamber therein, and burning it under conditions that will cause it to release energy at a high but controllable rate immediately after entry into the combustion chamber. Rocket propellants, as liquids, are advantageously utilized inasmuch as the liquid propellant material can be carried in a light weight, low pressure vessel and pumped into the combustion chamber, the latter though it must withstand high pressure and temperature, being only necessarily large enough to insure combustion. Also, the flow of liquid propellant into the combustion chamber can be regulated at will so that the thrust, continuous or in intermittent bursts of power, can be sustained, the latter type of liquid propellant flow contributing to a longer life of the combustion chamber and thrust nozzle.

Various liquids and liquid combinations have been found useful as rocket propellants. Some propellants consist of a single material, and are termed "monopropellants." Those propellants involving two materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine, or hydrogen; and nitric acid as the oxidizer with aniline or furfuryl alcohol as the hypergolic fuel component.

When employing 90–100 percent or more nitric acid, i. e., "white fuming nitric acid" as the oxidizer in a rocket bipropellant, it is often necessary, dependent on the specific fuel component, to make ignition more prompt by dissolving from 6 to 14 percent by weight of nitrogen dioxide in the white fuming nitric acid forming thereby "red fuming" nitric acid. A fuel component of a bipropellant material of the type described herein, is spontaneously ignited upon contacting the oxidizer, and for that reason is referred to herein as being "hypergolic." A ratio of oxidizer to hypergolic fuel based on stoichiometric amounts can be utilized within the limits of 0.5:1 to 1.5:1 if desired, the efficiency of the combustion being less at ratios below 1:1 and the use of the oxidizer being less economical at ratios above 1:1. However, practical considerations may necessitate the use of higher ranges, even as high as 6:1.

An object of this invention is to provide new rocket propellants. Another object is to provide hypergolic fuels. Another object is to provide a method for producing immediate thrust to a rocket. Other objects will be apparent to those skilled in the art from the accompanying discussion and disclosure.

In accordance with a broad embodiment of our invention we have provided rocket bipropellant materials, the fuel component of which comprises a morpholine characterized by the structural formula

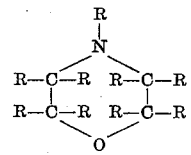

wherein R is a hydrogen atom or a hydrocarbon radical having not more than 12 carbon atoms and wherein the total number of carbon atoms present in the formula is not greater than 16. Accordingly R may be a hydrogen atom or a hydrocarbon radical selected from the group consisting of alkyl, alkenyl, aryl, cycloalkyl, cycloalkenyl, aralkyl, and alkaryl, the alkyl radicals especially those having less than three carbon atoms being preferred. These morpholines are also hypergolic when diluted with nonhypergolic fuels particularly hydrocarbons even in a state of dilution of 20–40% by volume and in some cases as high as 80 to 90% by volume. Suitable nonhypergolic diluents include the normally liquid hydrocarbons or mixtures thereof such as hydrocarbons, n-heptane, toluene, isooctane, benzene, diisobutylene, gasoline, jet fuels, kerosenes and the like.

Illustrative of the hypergolic hydrocarbon substituted morpholines of our invention are 2,5-dimethyl morpholine, 2-methyl-3-ethyl morpholine, 2-vinyl morpholine, 2-phenyl morpholine, 2-cumenyl morpholine, 2,5-dicyclohexyl morpholine, 2-cyclopropyl morpholine, 2,5 dicyclopentenyl morpholine, 2-benzyl morpholine, 2.5 ditert-butyl morpholine are suitable as well as their higher and lower molecular weight homologs. The 2-hydrocarbon substituted and 2,5-hydrocarbon substituted, preferably alkyl substituted, morpholines are preferred.

A particularly preferred group of morpholines suitable in the practice of our invention is characterized by those morpholines having the structural formula

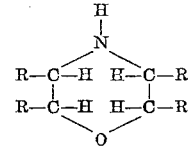

wherein R is a hydrogen atom or a hydrocarbon radical having not more than 12 carbon atoms and wherein the total number of carbon atoms present in the formula is not greater than 16. Thus R may be a hydrogen atom or a hydrocarbon radical selected from the group consisting of alkyl, alkenyl, aryl, cycloalkyl, cycloalkenyl, arylalkyl and alkaryl radicals.

Suitable oxidizers in addition to white or red fuming nitric acid can be used in the bipropellant fuel composition of our invention, particularly other oxidants such as hydrogen peroxide, ozone, nitrogen tetroxide, oxygen and mixed acids, particularly anhydrous mixtures of nitric and sulfuric acids such as 80–90 percent by volume white or red fuming nitric acid and 20–10 percent by volume anhydrous or fuming sulfuric acid. It is within the scope of this invention to employ, preferably dissolved in the oxidizer, ignition or oxidation catalysts.

These oxidation catalysts include certain metal salts such as the chlorides and naphthenates of iron, zinc, cobalt and similar heavy metals.

The advantages of this invention are illustrated in the following examples. The reactants and their proportions and their specific ingredients are presented as being typical and are not to be construed to limit the invention.

EXAMPLE 1

The materials described below were tested for spontaneous ignition employing fuming nitric acids as the oxidizer. In each test one part by volume of morpholine was dropped into a vessel containing 2.3 parts by volume fuming nitric acid. The morpholine upon coming into contact with the fuming nitric acid ignited spontaneously. Tests were conducted at room temperature, about 70° F. The results were set forth in Table No. 1.

*Table No. 1*

| Compound | Oxidant | Result |
|---|---|---|
| Morpholine | Red Fuming Nitric Acid | Ignition. |
| Do. | White Fuming Nitric Acid | Do. |

As an added feature of this invention the morpholines of this invention are also useful for providing fast burning fuels suitable for use in rocket engines and the like where a hypergolic fuel is not necessarily required. For example, the fuel components of this invention dissolved in a liquid hydrocarbon, such as a gasoline, a jet fuel, a kerosene, a naphtha or a petroleum fraction having a boiling point usually not greater than 800° F., even if the resulting solution is not hypergolic with an oxidant such as fuming nitric acid, can be used together with an oxidant and a suitable igniter as a rocket propellant. These fast burning fuels are particularly useful if for various reasons a hypergolic fuel is not desired or required. The morpholines of this invention may be added to a hydrocarbon liquid in a minor amount, usually from about 1 to 20% by volume of the total mixture to produce fast burning fuels. Suitable fuels are 1-20% by volume morpholine or 2,5-dimethyl-morpholine or 2-methyl-3-ethyl morpholine or 2-vinylmorpholine or 2-phenylmorpholine or mixtures thereof and 80-99% by volume of a petroleum fraction in the gasoline boiling range.

As will be evident to those skilled in the art various modifications can be made or followed in the light of the foregoing disclosure and discussion without departing from the spirit or scope of this invention.

We claim:

1. In the method for developing thrust by the combustion of bipropellant components in a combustion chamber of a reaction motor, the steps comprising separately and simultaneously injecting a stream of a liquid oxidant component and a fuel component into said combustion chamber in such proportion as to produce spontaneous ignition, said fuel component comprising a morpholine characterized by the structural formula

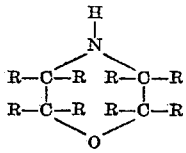

wherein R is selected from the group consisting of a hydrogen atom and a hydrocarbon radical selected from the group consisting of alkyl, alkenyl, aryl, cycloalkyl, cycloalkenyl, aralkyl, and alkaryl radicals having not more than 12 carbon atoms and wherein the total number of carbon atoms present in said formula is not greater than 16.

2. The method of claim 1 wherein said fuel component is incorporated with a nonhypergolic liquid hydrocarbon.

3. The method of claim 1 wherein said fuel component is morpholine.

4. The method of claim 1 wherein said fuel component is 2,5-dimethyl-morpholine.

5. The method of claim 1 wherein said fuel component is 2-methyl-3-ethylmorpholine.

6. The method of claim 1 wherein said fuel component is 2-vinylmorpholine.

7. The method of claim 1 wherein said fuel component is 2-phenylmorpholine.

8. A method for imparting immediate thrust to a mass comprising introducing into a combustion chamber of a reaction motor separate streams of a liquid oxidizer selected from the group consisting of white fuming nitric acid, red fuming nitric acid, hydrogen peroxide, ozone, nitrogen tetroxide, oxygen, and a mixture of at least 80 percent by volume of nitric acid with sulfuric acid, and of a fuel component of a bipropellant into contact with each other therein in a ratio of oxidizer to fuel component, based upon stoichiometric amounts, of 0.5:1 to 6:1 so as to produce spontaneous ignition, said fuel component being a 2-hydrocarbon substituted morpholine wherein said hydrocarbon group selected from the group consisting of alkyl, alkenyl, aryl, cycloalkyl, cycloalkenyl, aralkyl and alkaryl radicals contains not more than 12 carbon atoms and wherein said morpholine contains not more than 16 carbon atoms.

9. A method for imparting immediate thrust to a mass comprising introducing into a combustion chamber of a reaction motor separate streams of a liquid oxidizer selected from the group consisting of white fuming nitric acid, red fuming nitric acid, hydrogen peroxide, ozone, nitrogen tetroxide, oxygen, and a mixture of at least 80 percent by volume of nitric acid with sulfuric acid, and of a fuel component of a bipropellant into contact with each other therein in a ratio of oxidizer to fuel component, based upon stoichiometric amounts, of 0.5:1 to 6:1 so as to produce spontaneous ignition, said fuel components being a 2,5-hydrocarbon substituted morpholine wherein the hydrocarbon group selected from the group consisting of alkyl, alkenyl, aryl, cycloalkyl, cycloalkenyl, aralkyl and alkaryl radicals contains not more than 12 carbon atoms and wherein the total number of carbon atoms present in said hydrocarbon substituted morpholine is not greater than 16.

References Cited in the file of this patent

UNITED STATES PATENTS

| | | |
|---|---|---|
| 2,062,201 | Bartram | Nov. 24, 1936 |
| 2,239,841 | Cook | Apr. 29, 1941 |
| 2,512,197 | Biswell | June 20, 1950 |
| 2,573,471 | Malina et al. | Oct. 30, 1951 |
| 2,585,626 | Chilton | Feb. 12, 1952 |
| 2,638,441 | Nixon et al. | May 12, 1953 |